No. 797,929. PATENTED AUG. 22, 1905.
J. H. WILLIAMS.
MACHINE FOR CUTTING COTTON TO A STAND.
APPLICATION FILED DEC. 21, 1904.
2 SHEETS—SHEET 2.
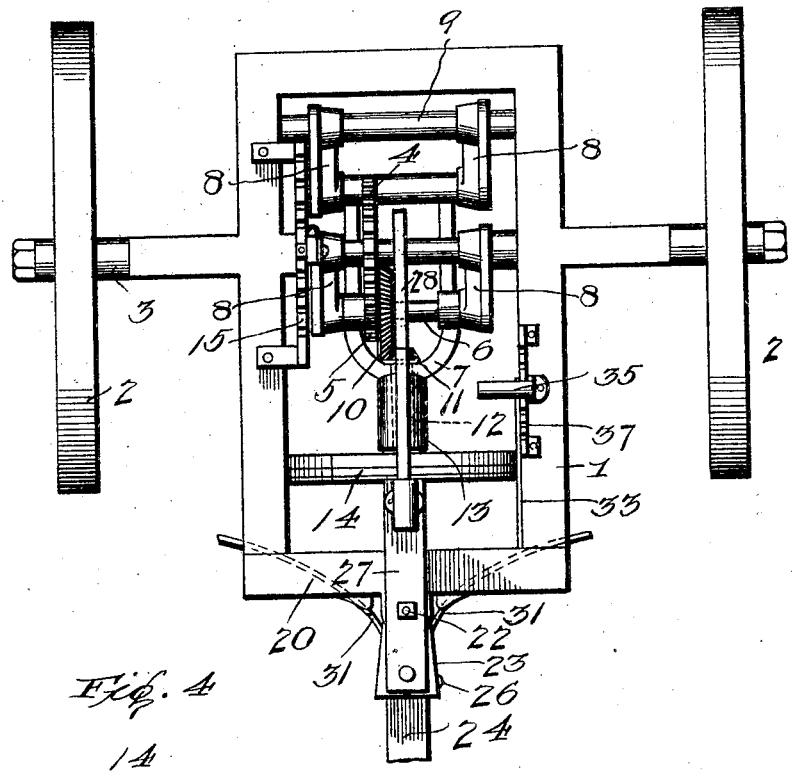
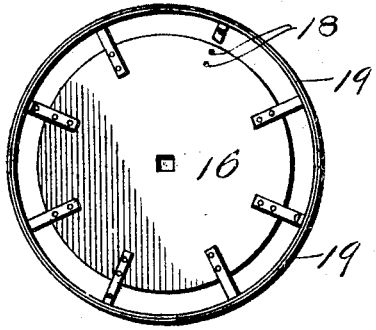
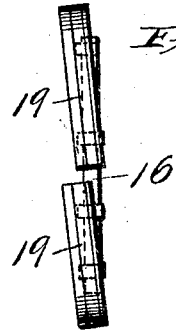

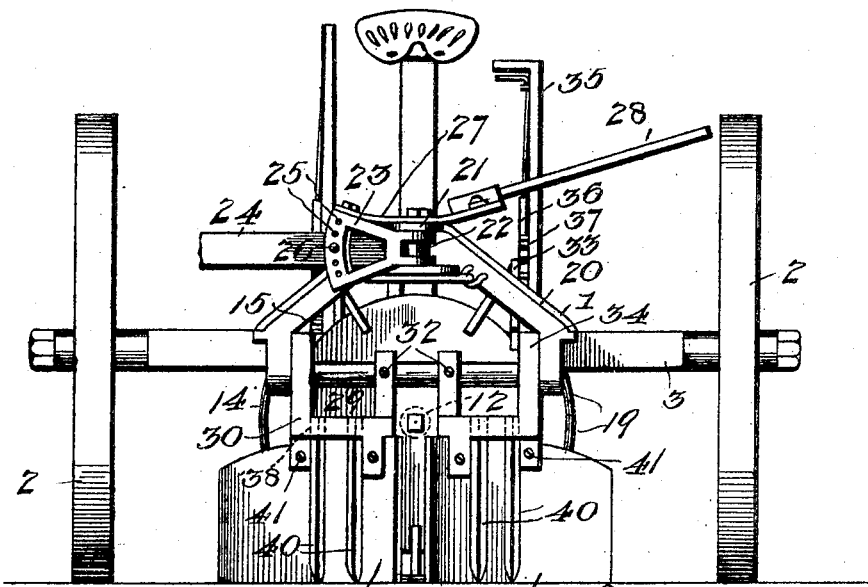

UNITED STATES PATENT OFFICE.

JAMES H. WILLIAMS, OF FAYETTEVILLE, ARKANSAS.

MACHINE FOR CUTTING COTTON TO A STAND.

No. 797,929.      Specification of Letters Patent.      Patented Aug. 22, 1905.

Application filed December 21, 1904. Serial No. 237,841.

*To all whom it may concern:*

Be it known that I, JAMES H. WILLIAMS, a citizen of the United States, residing at Fayetteville, in the county of Washington and State of Arkansas, have invented certain new and useful Improvements in Machines for Cutting Cotton to a Stand; and I do hereby declare the following to be a full, clear, and exact description of the invention, such as will enable others skilled in the art to which it appertains to make and use the same.

My invention relates to machines for cutting cotton or other plants.

It has for its object to provide a machine of the character described which will accomplish the work more expeditiously and satisfactorily.

The invention consists of adjustable perpendicular curved scrapers adapted to enter slightly below the surface, and thus remove the earth and young grass and weeds from each side of the row of cotton-plants, an adjustable cutter-wheel provided with adjustable knives mounted to revolve across the row behind the scrapers, a frame for said scrapers and cutter-wheel suitably mounted on wheels, and certain means for pivoting and operating the tongue.

In the accompanying drawings, illustrating the preferred embodiment of my invention, Figure 1 is a front view of the machine with the tongue turned to one side, showing the construction of the socket therefor. Fig. 2 is a side view with the near wheel broken away to show the cutter-wheel-operating mechanism, the raised position of the scrapers being shown in dotted lines. Fig. 3 is a plan view, and Figs. 4 and 5 are detail views of the cutter-wheel, showing different arrangements of the blades.

While the preferred embodiment of my invention is fully illustrated in the accompanying drawings and the construction and operation thereof is clearly described in this specification, the right is reserved to make such changes from the construction shown and described herein as the scope of the claims hereto appended will permit.

Referring more particularly to the drawings, in carrying out my invention I provide a frame 1, mounted on wheels 2 on a transverse shaft 3. Said shaft carries a cog-wheel 4, engaging another cog 5 on a shaft 6, mounted in a swinging frame 7, hung by four pivoted arms 8, the forward pair of said arms attached to the shaft 3 and the rear pair to a cross-bar 9, arranged rearward of, but in the horizontal plane with, said latter shaft. Said shaft 6 also carries a bevel pinion-wheel 10, meshing with a second bevel-gear 11 on a shaft 12, bearing in a forwardly-extending bracket 13 of the frame 7. The front end of said shaft is squared and receives the hub of the cutter-wheel 14, presently described. One of the forward arms 8 has an upwardly-extending hand-lever $7^a$, carrying a spring-pressed locking-pawl adapted to engage slots in a segment-bracket 15, whereby said swinging frame may be actuated to raise or lower the cutter-wheel. Said cutter-wheel is formed, preferably, of a circular plate 16, provided with bolt-holes 18 around its edges, whereby arms 17 are attached, to which arms the knives 19 are secured. Said arms 18 may be all secured to the same side of the wheel or they may alternate on opposite sides, as desired. If arranged all on the same side, as in Fig. 4, the arms will hold the knives so that they will cut straight across the row, while if said arms are alternated on opposite sides, as in Fig. 5, the knives will be arranged in a spiral, and the degree of spiral may be varied by the direction and length of the angle in the arms, also the length of the blades may be varied when arranged spirally. It will be readily seen that when all the knives are attached to the wheel in either of the positions shown in Figs. 4 or 5 said cutter will cut out all the plants. By removing one or more of the knives spaces may be left, so that patches of plants of any desired size may be left uncut by the machine.

At the forward end of the frame is an arch 20, at the highest point midway of which are two horizontal forwardly-extending brackets or short arms 21, arranged one above the other and perforated to receive a vertical bolt 22. Pivoted to said arch by means of said bolts is a socket-piece 23, adapted to receive the end of the tongue 24. Said socket-piece is fan-shaped, being of greater height at its outer end than at the pivot, and the sides of said outer end are provided with perforations 25 to receive a cross-bolt 26, adapted to pass through the tongue or pole, whereby the latter may be vertically adjusted. A plate 27 is secured at the top of the forward end of said socket-piece, is pivoted to the upper end of the bolt 22, and has a socket extending rearwardly therefrom to receive a lever 28, whereby the tongue may be turned laterally.

A cross-shaft 29 is pivotally connected below the arch 20 across the frame 1 and carries two brackets 30, each carrying an oppositely-curving blade or scraper 31, said bracket secured to said shaft by any suitable means, such as set-screws 32. A rod 33 connects an upstanding arm 34 of one of the brackets 30 and a pivoted hand-lever 35, which also carries a spring-pressed dog 36, adapted to engage slots in a segment-bracket 37, whereby said scrapers may be raised and lowered. Said brackets 30 have sockets 38 to receive harrow-teeth 40 on the concave sides of the scrapers, and said scrapers are normally adjusted to leave a space between them, so that as the machine is moved along the soil is turned away from each side of the row, leaving the bushes standing in the center to be cut out by the cutter-wheel, which is directly behind. It will be noted that the scrapers and the cutter-wheel may be raised independent of each other by means of their operating-levers 35 and $7^a$, respectively, and they both may be raised at the same time, so that the machine will pass over the ground without disturbing it. Said parts may, however, be easily brought into operation at the will of the driver of the machine, for whom a suitable seat is provided. Said scrapers are detachable from their brackets, being secured thereto by set-screws 41, and may be removed, if desired, and the machine used with the teeth as a harrow. It is understood, of course, that I do not limit myself to the use of my machine to operate on cotton-plants, as it may be utilized in the cultivation of various other plants.

Having thus described my invention, what I claim as new, and desire to secure by Letters Patent, is—

1. In a machine of the character described, a revolubly-mounted cutter-wheel adapted to revolve across the row, said wheel comprising a central disk having arms carrying detachable flat knives arranged at right angles to said arms, substantially as and for the purpose described.

2. In a machine of the character described, a revolubly-mounted cutter-wheel adapted to revolve across the row, said wheel comprising a central disk having detachable arms carrying detachable flat knives arranged at right angles to said arms, said arms and knives adjustable with relation to each other and with the disk, for the purpose specified.

3. In a machine of the character described, the combination with a main frame of a horizontal swinging frame hung from said main frame, a shaft journaled in said swinging frame and arranged longitudinally of the main frame, said shaft carrying a cutter-wheel on its outer end, means to swing said frame to raise and lower said cutter-wheel, and means to rotate said cutter-wheel-carrying shaft.

4. In a machine of the character described, the combination with the main frame and the wheel-carrying shaft carrying a gear, of a swinging frame hung from said wheel-shaft, said swinging frame having a revoluble cross-shaft having a gear meshing with the first-mentioned gear, a beveled pinion also on said cross-shaft, another shaft journaled in said swinging frame and arranged longitudinally of the main frame, said latter shaft carrying a cutter-wheel on its outer end and a bevel-pinion on its inner end meshing with the pinion on the cross-shaft, and means to swing said frame to raise and lower said cutter-wheel.

5. In a machine of the character described, the combination with the main frame and the wheel-carrying shaft carrying a gear, of a swinging frame hung from said wheel-shaft and a cross-bar of the main frame, said swinging frame having a revoluble cross-shaft having a gear meshing with the first-mentioned gear, a beveled pinion also on said cross-shaft, another shaft journaled in said swinging frame and arranged longitudinally of the main frame, said latter shaft carrying a cutter-wheel on its outer end and a beveled pinion on its inner end meshing with the pinion on the cross-shaft, and means to swing said frame to raise and lower said cutter-wheel.

6. In a machine of the character described, the combination with the main frame and the wheel-carrying shaft carrying a gear, of a swinging frame hung from said wheel-shaft, said swinging frame having a revoluble cross-shaft having a gear meshing with the first-mentioned gear, a beveled pinion also on said cross-shaft, another shaft journaled in said swinging frame and arranged longitudinally of the main frame, said latter shaft carrying a cutter-wheel on its outer end and a beveled pinion on its inner end meshing with the pinion on the cross-shaft, and hangers connecting said swinging frame with the wheel-carrying shaft, one of said hangers having an upwardly-extending handle portion whereby said frame may be oscillated to raise and lower the cutter-wheel.

In testimony whereof I affix my signature in presence of two witnesses.

J. H. WILLIAMS.

Witnesses:
J. D. WILSON,
CHAS. MORROW.